UNITED STATES PATENT OFFICE.

JOHN B. HIGLEY AND THOMAS F. RYAN, OF EDDYSTONE, PENNSYLVANIA.

COMPOSITION FOR COATING METALS.

945,843.

No Drawing.

Specification of Letters Patent. Patented Jan. 11, 1910.

Application filed August 9, 1909. Serial No. 511,881.

*To all whom it may concern:*

Be it known that we, JOHN B. HIGLEY and THOMAS F. RYAN, citizens of the United States, residing at Eddystone, in the county of Delaware and State of Pennsylvania, have invented certain new and useful Improvements in Composition for Coating Metals, of which the following is a specification.

Our invention relates to an improved composition for coating metals, the object of the invention being to provide an improved composition which when applied to metals will prevent the deteriorating effects of electrolysis, alkali deposits and rust, and which may be applied to the metal by means of a brush or in other ways in common use for applying paints.

The composition consists of a mixture of bees-wax, banana oil, rosin and linseed oil preferably in approximately the following proportions:

Bees-wax _____ 2 pounds
    Banana oil _____ 1 pint
    Rosin _____ 97 pounds
    Linseed oil _____ 2 gallons.

These ingredients are mixed together and boiled until the desired mixture and consistency of the composition is secured.

The banana oil serves to hold the bees-wax and rosin together and prevents any separation after the composition cools which would be the case if banana oil is omitted.

When applied to metals the composition will readily adhere and quickly dry.

The composition resulting from the proportion of ingredients such as above stated, when cooled, is of a gelatinous form and by varying the quantity of linseed oil this form is changed. In other words, a greater proportion of linseed oil than that above stated will result in a composition more resembling a liquid and a less proportion will produce a harder substance.

In applying the composition it is preferably heated so as to reduce it to liquid form and is then applied with a brush and may be, if desired, thinned out on the article coated by means of a heating torch and may, of course, be applied in various ways, to which we do not limit ourselves.

Having thus described our invention what we claim as new and desire to secure by Letters Patent is:—

1. A composition, consisting of bees-wax, banana oil, rosin and linseed oil.

2. A composition, consisting of bees-wax two pounds, banana oil one pint, rosin ninety-seven pounds, linseed oil two gallons, all boiled together in substantially the proportions stated.

3. A composition consisting of bees-wax, rosin and linseed oil, together with banana oil, which are mixed and heated, whereby the banana oil serves to combine and bind the bees-wax and rosin together.

In testimony whereof we have signed our names to this specification in the presence of two subscribing witnesses.

JOHN B. HIGLEY.
THOMAS F. RYAN.

Witnesses:
S. W. FOSTER,
J. A. L. MULHALL.